(12) United States Patent
Huang et al.

(10) Patent No.: US 12,168,461 B2
(45) Date of Patent: Dec. 17, 2024

(54) SYSTEMS AND METHODS FOR PREDICTING THE TRAJECTORY OF A MOVING OBJECT

(71) Applicant: Toyota Research Institute, Inc., Los Altos, CA (US)

(72) Inventors: Xin Huang, Cambridge, MA (US); Igor Gilitschenski, Newton, MA (US); Guy Rosman, Newton, MA (US); Stephen G. McGill, Jr., Cambridge, MA (US); John Joseph Leonard, Newton, MA (US); Ashkan Mohammadzadeh Jasour, Cambridge, MA (US); Brian C. Williams, Cambridge, MA (US)

(73) Assignees: Toyota Research Institute, Inc., Los Altos, CA (US); Massachusetts Institute of Technology, Cambridge, MA (US)

( * ) Notice: Subject to any disclaimer, the term of this patent is extended or adjusted under 35 U.S.C. 154(b) by 463 days.

(21) Appl. No.: 17/539,668

(22) Filed: Dec. 1, 2021

(65) Prior Publication Data

US 2022/0410938 A1 Dec. 29, 2022

Related U.S. Application Data

(60) Provisional application No. 63/216,017, filed on Jun. 29, 2021.

(51) Int. Cl.
*B60W 60/00* (2020.01)
*G05D 1/00* (2024.01)
*G06N 3/08* (2023.01)

(52) U.S. Cl.
CPC .. *B60W 60/0027* (2020.02); *B60W 60/00256* (2020.02); *G05D 1/0212* (2013.01);
(Continued)

(58) Field of Classification Search
CPC ....... B60W 60/0027; B60W 60/00256; B60W 2555/60; B60W 2556/65; G05D 1/0212; G06N 3/08
(Continued)

(56) References Cited

U.S. PATENT DOCUMENTS

| 11,631,344 B2* | 4/2023 | Gao | ..................... H04L 9/0866 |
| | | | 380/30 |
| 11,768,292 B2* | 9/2023 | Liang | ..................... G06V 10/82 |
| | | | 701/301 |

(Continued)

OTHER PUBLICATIONS

O. Makansi, E. Ilg, O. Cicek, and T. Brox, "Overcoming limitations of mixture density networks: A sampling and fitting framework for multimodal future prediction," in CVPR, 2019, pp. 7144-7153.
(Continued)

*Primary Examiner* — Yazan A Soofi
(74) *Attorney, Agent, or Firm* — Christopher G. Darrow; Darrow Mustafa PC

(57) ABSTRACT

Systems and methods for predicting a trajectory of a moving object are disclosed herein. One embodiment downloads, to a robot, a probabilistic hybrid discrete-continuous automaton (PHA) model learned as a deep neural network; uses the deep neural network to infer a sequence of high-level discrete modes and a set of associated low-level samples, wherein the high-level discrete modes correspond to candidate maneuvers for the moving object and the low-level samples are candidate trajectories; uses the sequence of high-level discrete modes and the set of associated low-level samples, via a learned proposal distribution in the deep neural network, to adaptively sample the sequence of high-level discrete modes to produce a reduced set of low-level samples; applies a sample selection technique to the reduced set of low-level samples to select a predicted trajectory for
(Continued)

the moving object; and controls operation of the robot based, at least in part, on the predicted trajectory.

20 Claims, 5 Drawing Sheets

(52) U.S. Cl.
CPC ........... *G06N 3/08* (2013.01); *B60W 2555/60* (2020.02); *B60W 2556/65* (2020.02)

(58) Field of Classification Search
USPC .......................................................... 701/25
See application file for complete search history.

(56) References Cited

U.S. PATENT DOCUMENTS

| | | | | |
|---|---|---|---|---|
| 11,842,523 | B2* | 12/2023 | Subramanian | G06T 7/248 |
| 11,900,797 | B2* | 2/2024 | Ramamoorthy | G06N 5/045 |
| 2013/0335635 | A1* | 12/2013 | Ghanem | G06T 7/277 348/571 |
| 2019/0354105 | A1* | 11/2019 | Cunningham | G05D 1/0246 |
| 2020/0283016 | A1* | 9/2020 | Blaiotta | B60W 60/0011 |
| 2022/0126864 | A1* | 4/2022 | Moustafa | G06T 1/0007 |

OTHER PUBLICATIONS

L. A. Thiede and P. P. Brahma, "Analyzing the Variety Loss in the Context of Probabilistic Trajectory Prediction," in ICCV, 2019.
X. Huang, S. G. McGill, J. A. DeCastro, L. Fletcher, J. J. Leonard, B. C. Williams, and G. Rosman, "DiversityGAN: Diversity-aware vehicle motion prediction via latent semantic sampling," IEEE Robotics and Automation Letters, vol. 5, No. 4, pp. 5089-5096, 2020.
N. Deo and M. M. Trivedi, "Multi-modal trajectory prediction of surrounding vehicles with maneuver based LSTMs," in IVS, 2018, pp. 1179-1184.
J. Guan, Y. Yuan, K. M. Kitani, and N. Rhinehart, "Generative hybridrepresentations for activity forecasting with no-regret learning," in CVPR, 2020, pp. 173-182.
H. Zhao, J. Gao, T. Lan, C. Sun, B. Sapp, B. Varadarajan, Y. Shen, Y. Shen, Y. Chai, C. Schmid et al., "TNT: Target-driven trajectory prediction," in CoRL, 2020.
L. Zhang, P.-H. Su, J. Hoang, G. C. Haynes, and M. Marchetti-Bowick, "Map-adaptive goal-based trajectory prediction," in CoRL, 2020.
T. Gilles, S. Sabatini, D. Tsishkou, B. Stanciulescu, and F. Moutarde, "HOME: Heatmap output for future motion estimation," arXiv preprint arXiv:2105.10968, 2021.
M. W. Hofbaur and B. C. Williams, "Hybrid estimation of complex systems," IEEE Transactions on Systems, Man, and Cybernetics, Part B (Cybernetics), vol. 34, No. 5, pp. 2178-2191, 2004.
H. A. Blom and Y. Bar-Shalom, "The interacting multiple model algorithm for systems with Markovian switching coefficients," TACON, vol. 33, No. 8, pp. 780-783, 1988.
P. Andersson, "Adaptive forgetting in recursive identification through multiple models," International Journal of Control, vol. 42, No. 5, pp. 1175-1193, 1985.
L. Blackmore, S. Funiak, and B. C. Williams, "A combined stochastic and greedy hybrid estimation capability for concurrent hybrid models with autonomous mode transitions," Robotics and Autonomous Systems, vol. 56, No. 2, pp. 105-129, 2008.
D. Koller, U. Lerner, and D. Anguelov, "A general algorithm for approximate inference and its application to hybrid Bayes nets," in UAI, 1999.
S. K. Jayaraman, L. P. Robert, X. J. Yang, and D. M. Tilbury, "Multimodal hybrid pedestrian: A hybrid automaton model of urban pedestrian behavior for automated driving applications," IEEE Access, vol. 9, pp. 27 708-27 722, 2021.

P. Kothari, B. Sifringer, and A. Alahi, "Interpretable social anchors for human trajectory forecasting in crowds," in CVPR, 2021.
S. Gu, Z. Ghahramani, and R. E. Turner, "Neural adaptive sequential Monte Carlo," in NeurIPS, 2015, pp. 2629-2637.
A. Gupta, J. Johnson, L. Fei-Fei, S. Savarese, and A. Alahi, "Social GAN: Socially acceptable trajectories with generative adversarial networks," in CVPR, 2018, pp. 2255-2264.
N. Lee, W. Choi, P. Vernaza, C. B. Choy, P. H. Torr, and M. Chandraker, "DESIRE: Distant future prediction in dynamic scenes with interacting agents," in CVPR, 2017, pp. 336-345.
T. Salzmann, B. Ivanovic, P. Chakravarty, and M. Pavone, "Trajectron++: Multi-agent generative trajectory forecasting with heterogeneous data for control," ECCV, 2020.
T. Phan-Minh, E. C. Grigore, F. A. Boulton, O. Beijbom, and E. M. Wolff, "Covernet: Multimodal behavior prediction using trajectory sets," in CVPR, 2020, pp. 14 074-14 083.
Y. Yuan and K. M. Kitani, "Diverse trajectory forecasting with determinantal point processes," in ICLR, 2020.
D. Richardos, B. Anastasia, D. Georgios, and A. Angelos, "Vehicle maneuver-based long-term trajectory prediction at intersection crossings," in CAVS. IEEE, 2020, pp. 1-6.
M. Hasan, E. Paschalidis, A. Solernou, H. Wang, G. Markkula, and R. Romano, "Maneuver-based anchor trajectory hypotheses at roundabouts," arXiv preprint arXiv:2104.11180, 2021.
K. Mangalam, H. Girase, S. Agarwal, K.-H. Lee, E. Adeli, J. Malik, and A. Gaidon, "It is not the journey but the destination: Endpoint conditioned trajectory prediction," in ECCV. Springer, 2020, pp. 759-776.
K. Mangalam, Y. An, H. Girase, and J. Malik, "From goals, waypoints & paths to long term human trajectory forecasting," arXiv preprint arXiv:2012.01526, 2020.
Y. Liu, J. Zhang, L. Fang, Q. Jiang, and B. Zhou, "Multimodal motion prediction with stacked transformers," in CVPR, 2021.
H. Tran, V. Le, and T. Tran, "Goal-driven long-term trajectory prediction," in WACV, 2021, pp. 796-805.
B. Kim, S. H. Park, S. Lee, E. Khoshimjonov, D. Kum, J. Kim, J. S. Kim, and J. W. Choi, "LaPred: Lane-aware prediction of multimodal future trajectories of dynamic agents," in CVPR, 2021.
H. Song, D. Luan, W. Ding, M. Y. Wang, and Q. Chen, "Learning to predict vehicle trajectories with model-based planning," arXiv preprint arXiv:2103.04027, 2021.
S. Narayanan, R. Moslemi, F. Pittaluga, B. Liu, and M. Chandraker, "Divide-and-conquer for lane-aware diverse trajectory prediction," in CVPR, 2021.
L. Blackmore, S. Gil, S. Chung, and B. Williams, "Model learning for switching linear systems with autonomous mode transitions," in CDC. IEEE, 2007, pp. 4648-4655.
E. M. Timmons and B. C. Williams, "Best-first enumeration based on bounding conflicts, and its application to large-scale hybrid estimation," JAIR, vol. 67, pp. 1-34, 2020.
P. Becker-Ehmck, J. Peters, and P. Van Der Smagt, "Switching linear dynamics for variational bayes filtering," in ICML. PMLR, 2019, pp. 553-562.
M. W. Hofbaur and B. C. Williams, "Mode estimation of probabilistic hybrid systems," in International Workshop on Hybrid Systems: Computation and Control. Springer, 2002, pp. 253-266.
S. Linderman, M. Johnson, A. Miller, R. Adams, D. Blei, and L. Paninski, "Bayesian learning and inference in recurrent switching linear dynamical systems," in Artificial Intelligence and Statistics. PMLR, 2017, pp. 914-922.
A. Alahi, K. Goel, V. Ramanathan, A. Robicquet, L. Fei-Fei, and S. Savarese, "Social LSTM: Human trajectory prediction in crowded spaces," in CVPR, 2016, pp. 961-971.
S. H. Park, B. Kim, C. M. Kang, C. C. Chung, and J. W. Choi, "Sequence-to-sequence prediction of vehicle trajectory via LSTM encoder-decoder architecture," in 2018 IEEE Intelligent Vehicles Symposium (IV). IEEE, 2018, pp. 1672-1678.
P. Del Moral, A. Doucet, and A. Jasra, "An adaptive sequential Monte Carlo method for approximate Bayesian computation," Statistics and computing, vol. 22, No. 5, pp. 1009-1020, 2012.
C. Naesseth, S. Linderman, R. Ranganath, and D. Blei, "Variational sequential monte carlo," in AISTATS. PMLR, 2018, pp. 968-977.

(56) References Cited

OTHER PUBLICATIONS

Y. Xu, J. Choi, S. Dass, and T. Maiti, "Sequential bayesian prediction and adaptive sampling algorithms for mobile sensor networks," TACON, vol. 57, No. 8, pp. 2078-2084, 2011.

R. Bardenet, A. Doucet, and C. Holmes, "Towards scaling up Markov chain Monte Carlo: an adaptive subsampling approach," in ICML. PMLR, 2014, pp. 405-413.

N.-C. Xiao, M. J. Zuo, and C. Zhou, "A new adaptive sequential sampling method to construct surrogate models for efficient reliability analysis," Reliability Engineering & System Safety, vol. 169, pp. 330-338, 2018.

A. Wang, X. Huang, A. Jasour, and B. Williams, "Fast risk assessment for autonomous vehicles using learned models of agent futures," in RSS, 2020.

R. Krishnan, U. Shalit, and D. Sontag, "Structured inference networks for nonlinear state space models," in AAAI, vol. 31, No. 1, 2017.

J. Gao, C. Sun, H. Zhao, Y. Shen, D. Anguelov, C. Li, and C. Schmid, "VectorNet: Encoding HD maps and agent dynamics from vectorized representation," in CVPR, 2020, pp. 11 525-11 533.

I. Sutskever, O. Vinyals, and Q. V. Le, "Sequence to sequence learning with neural networks," in Advances in neural information processing systems, 2014, pp. 3104-3112.

R. Zhao, X. Sun, and V. Tresp, "Maximum entropy-regularized multigoal reinforcement learning," in ICML. PMLR, 2019, pp. 7553-7562.

T. F. Gonzalez, "Clustering to minimize the maximum intercluster distance," Theoretical computer science, vol. 38, pp. 293-306, 1985.

M.-F. Chang, J. Lambert, P. Sangkloy, J. Singh, S. Bak, A. Hartnett, D. Wang, P. Carr, S. Lucey, D. Ramanan et al., "Argoverse: 3D tracking and forecasting with rich maps," in CVPR, 2019, pp. 8748-8757.

E. Jang, S. Gu, and B. Poole, "Categorical reparameterization with Gumbel-Softmax," arXiv preprint arXiv:1611.01144, 2016.

C. Mishra et al., "Efficient Estimation of Probability of Conflict Between Air Traffic Using Subset Simulation." arXiv:1604.07363v1 [cs.SY], Apr. 25, 2016, found at https://arxiv.org/pdf/1604.07363.pdf.

H. Kretzschmar et al, "Learning to Predict Trajectories of Cooperatively Navigating Agents," Proceedings of the 2014 IEEE International Conference on Robotics and Automation (ICRA), May 31, 2014, found at https://europa2.informatik.uni-freiburg.de/files/kretzschmar14icra.pdf.

X. Huang et al., "DiversityGAN: Diversity-Aware Vehicle Motion Prediction via Latent Semantic Sampling," arXiv:1911.12736v2 [cs.RO], Mar. 22, 2020, available at https://arxiv.org/pdf/1911.12736.pdf.

A. L. Visintini et al., "Monte Carlo Optimization for Conflict Resolution in Air Traffic Control," IEEE Transactions on Intelligent Transportation Systems, vol. 7, No. 4, Dec. 2006, pp. 470-482, found at https://www2.le.ac.uk/departments/engineering/people/academic-staff/andrea-lecchini-visintini/IEEEITS06.pdf.

D. P. Kingma and J. Ba, "Adam: A method for stochastic optimization," in ICLR, 2015.

X. Weng, Y. Yuan, and K. Kitani, "PTP: Parallelized tracking and prediction with graph neural networks and diversity sampling," IEEE Robotics and Automation Letters, vol. 6, No. 3, pp. 4640-4647, 2021.

Y. Chai, B. Sapp, M. Bansal, and D. Anguelov, "Multipath: Multiple probabilistic anchor trajectory hypotheses for behavior prediction," in CoRL, 2019.

B. Ivanovic and M. Pavone, "The trajectron: Probabilistic multi-agent trajectory modeling with dynamic spatiotemporal graphs," in ICCV, 2019, pp. 2375-2384.

D. S. Hochbaum and D. B. Shmoys. A best possible heuristic for the k-center problem. Mathematics of operations research, 10(2):180-184, 1985.

M. P. Deisenroth, R. D. Turner, M. F. Huber, U. D. Hanebeck, and C. E. Rasmussen. Robust filtering and smoothing with gaussian processes. IEEE Transactions on Automatic Control, 57 (7):1865-1871, 2011.

* cited by examiner

SYSTEMS AND METHODS FOR PREDICTING THE TRAJECTORY OF A MOVING OBJECT

CROSS-REFERENCE TO RELATED APPLICATION

This application claims the benefit of U.S. Provisional Patent Application No. 63/216,017, "DeepHybrid: Learned Hybrid Trajectory Prediction via Factored Inference and Adaptive Sampling," filed Jun. 29, 2021, which is incorporated by reference herein in its entirety.

TECHNICAL FIELD

The subject matter described herein generally relates to robots and, more particularly, to systems and methods for predicting a trajectory of a moving object.

BACKGROUND

Predicting the trajectory of a moving object is an important task in a variety of robotics applications, including autonomous vehicles. Conventional approaches to trajectory prediction often assume the intent governing the moving object (e.g., the intent of the driver of a vehicle) remains fixed over the prediction horizon. This assumption stems from the challenge of the discrete space growing exponentially if an attempt is made to account for evolving discrete intent. Unfortunately, this assumption negatively impacts the performance of conventional trajectory prediction systems.

SUMMARY

An example of a system for predicting a trajectory of a moving object is presented herein. The system comprises one or more processors and a memory communicably coupled to the one or more processors. The memory stores a communication module including instructions that when executed by the one or more processors cause the one or more processors to download, to a robot, a probabilistic hybrid discrete-continuous automaton (PHA) model learned as a deep neural network. The learned PHA model models a moving object in an environment of the robot. The memory also stores a trajectory prediction module including instructions that when executed by the one or more processors cause the one or more processors to use the deep neural network to infer a sequence of high-level discrete modes and a set of associated low-level samples. The high-level discrete modes correspond to candidate maneuvers for the moving object, and the low-level samples are candidate trajectories for the moving object. The trajectory prediction module also includes instructions that when executed by the one or more processors cause the one or more processors to use the sequence of high-level discrete modes and the set of associated low-level samples, via a learned proposal distribution in the deep neural network, to adaptively sample the sequence of high-level discrete modes to produce a reduced set of low-level samples. The trajectory prediction module also includes instructions that when executed by the one or more processors cause the one or more processors to apply a sample selection technique to the reduced set of low-level samples to select a predicted trajectory for the moving object. The memory also stores a control module including instructions that when executed by the one or more processors cause the one or more processors to control operation of the robot based, at least in part, on the predicted trajectory.

Another embodiment is a non-transitory computer-readable medium for predicting a trajectory of a moving object and storing instructions that when executed by one or more processors cause the one or more processors to download a probabilistic hybrid discrete-continuous automaton (PHA) model learned as a deep neural network. The learned PHA model models a moving object in an environment of a robot. The instructions also cause the one or more processors to use the deep neural network to infer a sequence of high-level discrete modes and a set of associated low-level samples. The high-level discrete modes correspond to candidate maneuvers for the moving object, and the low-level samples are candidate trajectories for the moving object. The instructions also cause the one or more processors to use the sequence of high-level discrete modes and the set of associated low-level samples, via a learned proposal distribution in the deep neural network, to adaptively sample the sequence of high-level discrete modes to produce a reduced set of low-level samples. The instructions also cause the one or more processors to apply a sample selection technique to the reduced set of low-level samples to select a predicted trajectory for the moving object. The instructions also cause the one or more processors to control operation of the robot based, at least in part, on the predicted trajectory.

In another embodiment, a method of predicting a trajectory of a moving object is disclosed. The method comprises downloading a probabilistic hybrid discrete-continuous automaton (PHA) model learned as a deep neural network. The learned PHA model models a moving object in an environment of a robot. The method also includes using the deep neural network to infer a sequence of high-level discrete modes and a set of associated low-level samples. The high-level discrete modes correspond to candidate maneuvers for the moving object, and the low-level samples are candidate trajectories for the moving object. The method also includes using the sequence of high-level discrete modes and the set of associated low-level samples, via a learned proposal distribution in the deep neural network, to adaptively sample the sequence of high-level discrete modes to produce a reduced set of low-level samples. The method also includes applying a sample selection technique to the reduced set of low-level samples to select a predicted trajectory for the moving object. The method also includes controlling operation of the robot based, at least in part, on the predicted trajectory.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

Various embodiments disclosed herein overcome the limitations in conventional trajectory prediction systems that result from assuming that intent remains fixed over the prediction horizon. These various embodiments model moving objects such as ego vehicles and traffic agents (also sometimes referred to herein as "road agents") as a hybrid discrete-continuous system to predict discrete intent changes over time. More specifically, these embodiments learn a probabilistic hybrid automaton (PHA) model as a deep neural network via a maximum likelihood estimation problem. The various embodiments disclosed herein leverage a learned proposal function in the deep neural network to sample adaptively from the exponentially growing discrete space. The samples (candidate future trajectories of a moving object) can be further reduced in number using a sample selection technique such as a farthest-point-sampling (FPS) algorithm. The result is an improved tradeoff between accuracy and coverage.

The techniques described herein have wide applicability to situations in which a robot predicts the future trajectory of a moving object. For example, in some embodiments, the robot is a vehicle, and the moving object is the vehicle itself (i.e., an ego vehicle). If the vehicle is driven manually, there is, of course, uncertainty regarding the evolving intentions of the human driver. Even if the vehicle is autonomous (self-driving), however, the techniques described herein can be employed in the planner of such a vehicle (e.g., to plan the vehicle's future path/trajectory). In other embodiments, the robot is a vehicle, and the moving object is an external road agent in the environment of the vehicle, such as another vehicle, a motorcycle, a bicycle, a pedestrian, a child, or an animal. In still other embodiments, the robot is a type of robot other than a vehicle, such as, without limitation, an indoor robot, a service robot, or a delivery robot. In those embodiments, the moving object whose trajectory is predicted can be the robot itself (e.g., the techniques described herein can be used to aid the robot's trajectory/path planning) or any of a variety of objects in the environment of the robot.

Figure 1:
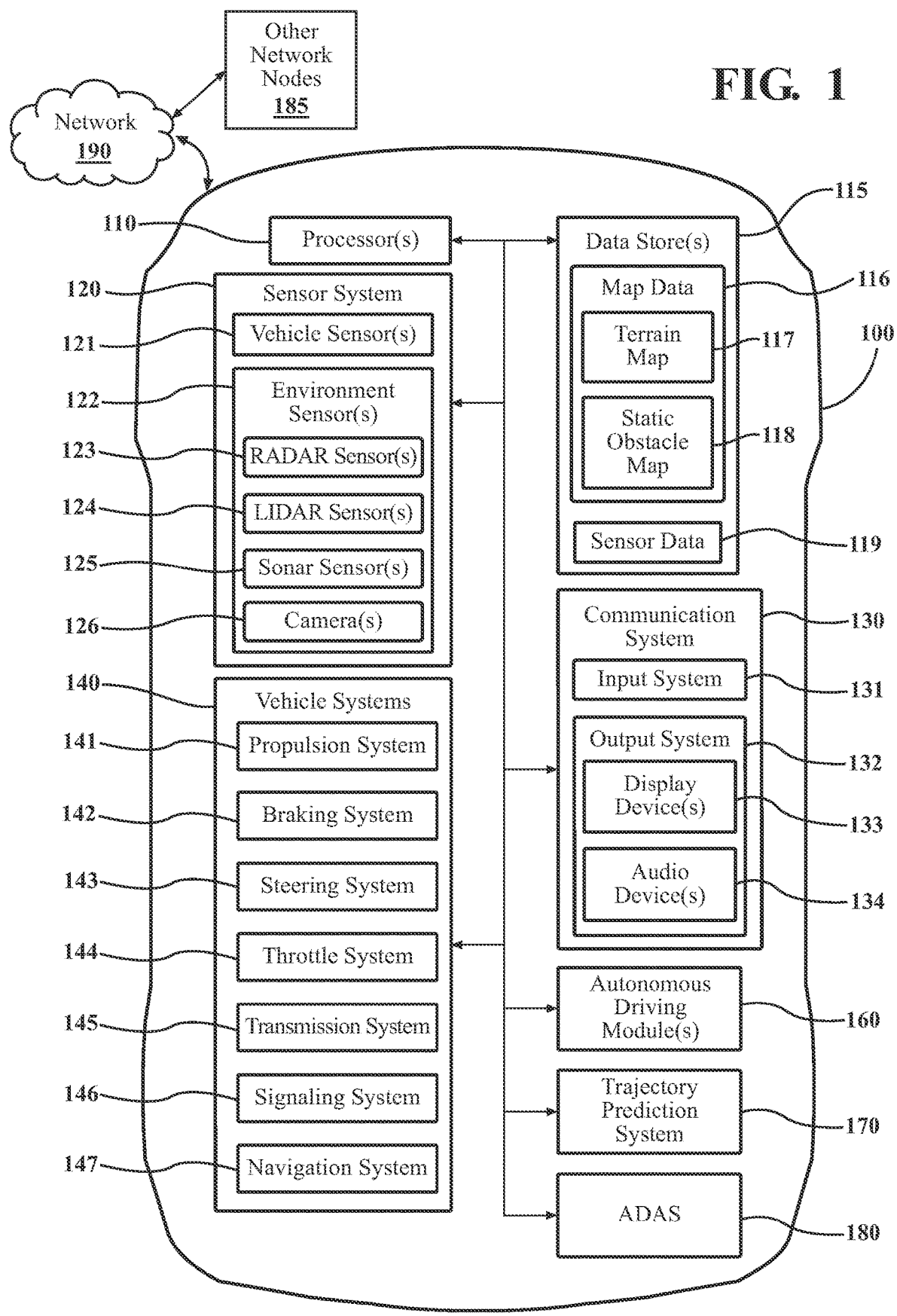
FIG. 1 illustrates one embodiment of a vehicle within which systems and methods disclosed herein may be implemented.

Referring to FIG. 1, an example of a vehicle 100, in which systems and methods disclosed herein can be implemented, is illustrated. As mentioned above, a vehicle 100 is merely one example of a robot or machine in which the trajectory-prediction techniques described herein can be embodied. In other embodiments, the robot can be any of a variety of robots, including, without limitation, an indoor robot, a service robot, or a delivery robot.

A vehicle 100 is sometimes referred to herein as an "ego vehicle," in which a trajectory prediction system 170 is installed. The trajectory prediction system 170 in a vehicle 100 can be used to predict the future trajectory of the ego vehicle itself, in some embodiments. In other embodiments, the trajectory prediction system 170 can predict the future trajectory of an external road agent or other moving object in the environment, whether that moving object is on a roadway or not. As used herein, a "vehicle" is any form of motorized transport. One example of a "vehicle," without limitation, is an automobile. In some embodiments, vehicle 100 can operate, at least some of the time, in a fully autonomous mode (e.g., what the automotive industry refers to as autonomy Levels 3-5, particularly Level 5). In other embodiments, vehicle 100 can operate in a semi-autonomous mode (e.g., via an adaptive cruise-control system, an automatic lane-change assistance system, or an automatic parking system). In other embodiments, vehicle 100 includes an intelligent driving assistance system such as an Advanced Driver-Assistance System (ADAS) 180. In still other embodiments, vehicle 100 may be driven manually by a human driver. The vehicle 100 can include a trajectory prediction system 170 or capabilities to support or interact with the trajectory prediction system 170 and thus benefits from the functionality discussed herein. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including trajectory prediction system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 can communicate with other network nodes 185 (e.g., other connected vehicles, cloud servers, edge servers, roadside units, infrastructure devices and equipment) via a network 190. In some embodiments, network 190 includes the Internet.

Some of the possible elements of the vehicle 100 are shown in FIG. 1 and will be described in connection with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Sensor system 120 can include one or more vehicle sensors 121. Vehicle sensors 121 can include one or more positioning systems such as a dead-reckoning system or a global navigation satellite system (GNSS) such as a global positioning system (GPS). Vehicle sensors 121 can also include Controller-Area-Network (CAN) sensors that output, for example, speed and steering-angle data pertaining to vehicle 100. Sensor system 120 can also include one or more environment sensors 122. Environment sensors 122 generally include, without limitation, radar sensor(s) 123, Light Detection and Ranging (LIDAR) sensor(s) 124, sonar sensor(s) 125, and camera(s) 126. One or more of these various types of environment sensors 122 can be used to ascertain the state of vehicle 100 (its speed, acceleration, observed trajectory data, etc.) and to detect moving objects such as external road agents or other objects in the environment of vehicle 100, whether on or off of the roadway. Thus, sensor system 120 contributes to trajectory prediction system 170 understanding the environment surrounding vehicle 100 and its associated traffic situations and conditions. The information that trajectory prediction system 170 derives from sensor system 120 is a portion of what is referred to herein as "context information." Other examples of context information are discussed below. In some embodiments, this analysis of the external environment and traffic situations can be carried out entirely or in part in conjunction with an Advanced Driver-Assistance System (ADAS) 180. In embodiments in which vehicle 100 is capable of semi-autonomous or fully autonomous operation, vehicle 100 includes autonomous driving module(s) 160 to control autonomous or semi-autonomous operation.

Figure 2:
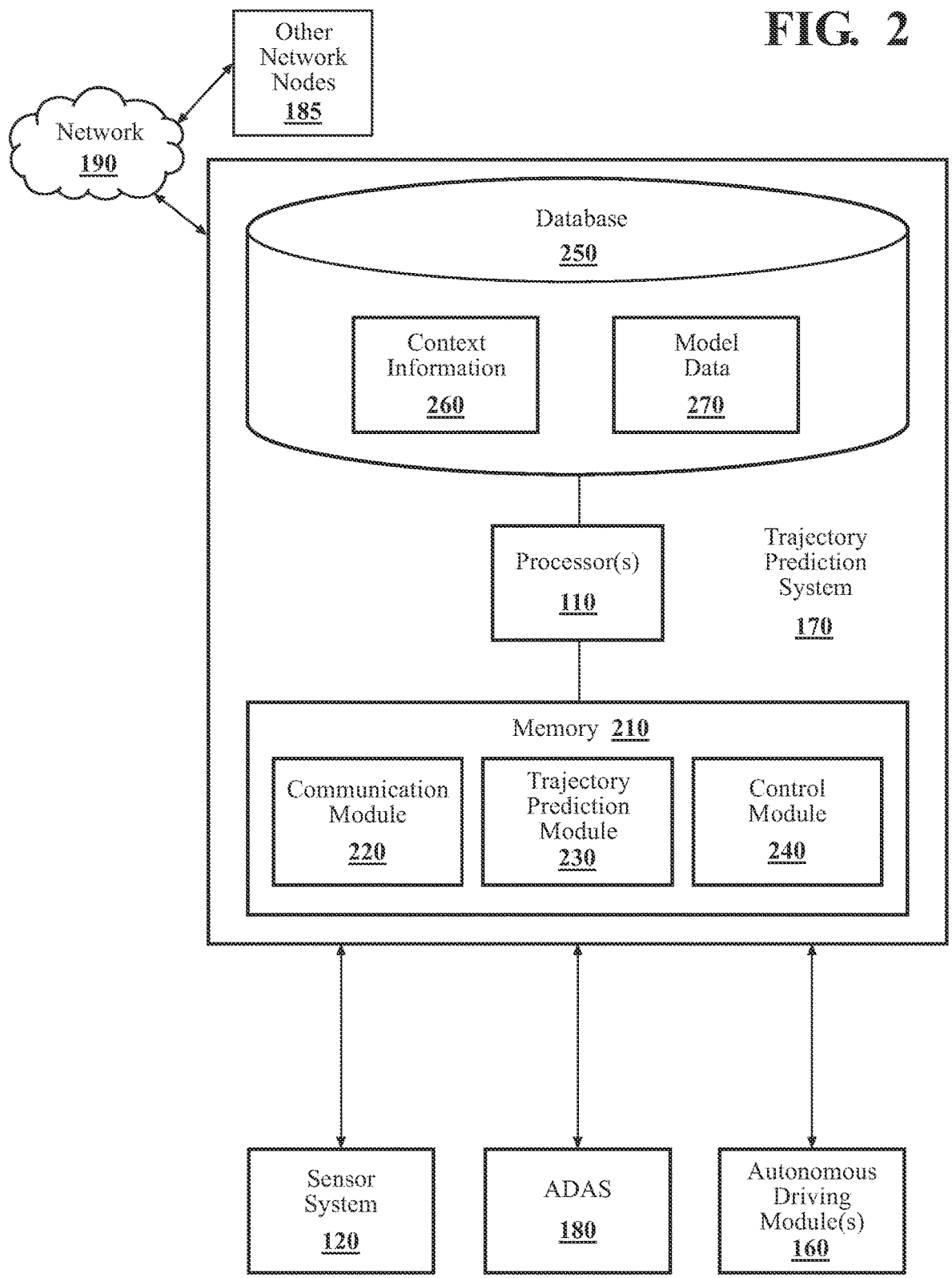
FIG. 2 is a block diagram of a trajectory prediction system, in accordance with an illustrative embodiment of the invention.

FIG. 2 is a block diagram of a trajectory prediction system 170, in accordance with an illustrative embodiment of the invention. As discussed above, in some embodiments, the robot in which trajectory prediction system 170 is installed is a vehicle 100. In the embodiment depicted in FIG. 2, trajectory prediction system 170 is shown as including one or more processors 110 from the vehicle 100 of FIG. 1. In general, the one or more processors 110 may be a part of trajectory prediction system 170, trajectory prediction system 170 may include one or more separate processors from the one or more processors 110 of the vehicle 100, or trajectory prediction system 170 may access the one or more processors 110 through a data bus or another communication path, depending on the embodiment.

In this embodiment, memory 210 stores a communication module 220, a trajectory prediction module 230, and a control module 240. The memory 210 is a random-access memory (RAM), read-only memory (ROM), a hard-disk drive, a flash memory, or other suitable memory for storing the modules 220, 230, and 240. The modules 220, 230, and 240 are, for example, computer-readable instructions that, when executed by the one or more processors 110, cause the one or more processors 110 to perform the various functions disclosed herein.

As shown in FIG. 2 and as discussed above, trajectory prediction system 170 can communicate with one or more other network nodes 185 (e.g., other connected vehicles, cloud servers, edge servers, roadside units, infrastructure, etc.) via network 190. Trajectory prediction system 170 can also interface and communicate with sensor system 120, autonomous driving module(s) 160, and ADAS 180. In communicating with other connected vehicles, a vehicle 100 can employ Dedicated Short-Range Communications (DSRC), Wi-Fi, or mmWave technology to establish one or more vehicle-to-vehicle (V2V) communication links. In communicating with servers, a vehicle 100 can employ technologies such as cellular data (e.g., LTE, 5G, 6G).

Trajectory prediction system 170 can store various kinds of data in a database 250. Examples include context information 260 and model data 270. Model data 270 can include a variety of different kinds of data and information associated with the deep neural networks in trajectory prediction system 170, such as the results of intermediate calculations, model parameters, model hyperparameters, model weights, etc.

Communication module 220 generally includes instructions that when executed by the one or more processors 110 cause the one or more processors 110 to download, to a robot (in this particular embodiment, a vehicle 100), a probabilistic hybrid discrete-continuous automaton (PHA) model learned as a deep neural network. The learned PHA model models a moving object (not shown in FIG. 2) in the environment of the robot. In this embodiment, the PHA model is learned (trained) at a server or other computing system separate from vehicle 100, and the learned PHA model is subsequently downloaded to vehicle 100 over network 190 so that the learned PHA model can be deployed in trajectory prediction system 170. The PHA model and how the deep neural network that learns the PHA model is trained are discussed in greater detail below.

Trajectory prediction module 230 generally includes instructions that when executed by the one or more processors 110 cause the one or more processors 110 to use the deep neural network mentioned above to infer a sequence of high-level discrete modes and a set of associated low-level samples. The high-level discrete modes correspond to candidate maneuvers for the moving object, and the low-level samples are candidate trajectories for the moving object. Examples of high-level discrete modes include, without limitation, a right turn, a left turn, a U-turn, slowing down (decelerating), speeding up (accelerating), stopping (e.g., for a stop sign, traffic signal, or passing cross-traffic), proceeding after a stop, and stopping for an indefinite period and then proceeding. Many, but not necessarily all, of these high-level discrete modes are associated with traffic intersections. Examples of low-level samples (candidate trajectories) are illustrated and discussed further below. Trajectory prediction module 230 also includes instructions that when executed by the one or more processors 110 cause the one or more processors 110 to use the sequence of high-level discrete modes and the set of associated low-level samples, via a learned proposal distribution in the deep neural network, to adaptively sample the sequence of high-level discrete modes to produce a reduced set of low-level samples. Adaptive sampling and the learned proposal distribution are also discussed in greater detail below. Trajectory prediction module 230 also includes instructions that when executed by the one or more processors 110 cause the one or more processors 110 to apply a sample selection technique to the reduced set of low-level samples to select a predicted trajectory for the moving object. Sample selection techniques are also discussed in further detail below. In some embodiments, the sample selection technique produces a set of selected trajectories, from which a single (e.g., most-likely) trajectory can be further selected. Also, in some embodiments, the sample selection technique employed is a farthest-point-sampling (FPS) algorithm.

In some embodiments, the deep neural network that learns the PHA model includes an encoder Long Short-Term Memory (LSTM) network that encodes context information 260 concerning the environment of the robot (e.g., a vehicle 100) and a decoder LSTM network that generates a sequence of hybrid states in accordance with the learned PHA model. Depending on the embodiment, the context information 260 can include one or more of environment-sensor data, map data, observation data pertaining to the moving object, trajectory data associated with the robot (e.g., vehicle 100) and/or the moving object, traffic Signal Phase and Timing (SPaT) data, and information received from other vehicles via vehicle-to-vehicle (V2V) communication (in embodiments like that shown in FIG. 2, in which the robot is a vehicle 100). In these embodiments, the decoder LSTM network includes a transition function, a dynamics function, and the learned proposal distribution. These concepts and the underlying mathematical principles are discussed in greater detail below.

Control module 240 generally includes instructions that when executed by the one or more processors 110 cause the one or more processors 110 to control operation of the robot (e.g., a vehicle 100) based, at least in part, on the predicted trajectory. Controlling the operation of the robot (vehicle 100) can include, for example, controlling the speed and/or the steering (trajectory/path) of vehicle 100. For example, in some embodiments, the robot adjusts its speed and/or trajectory to avoid colliding with the moving object, based on the predicted trajectory of the moving object. Collision avoidance is merely one example of how a robot might use the predicted trajectory of a moving object. For example, in embodiments in which the robot is an autonomous vehicle and the robot itself is the moving object, the autonomous vehicle can adjust its speed and/or trajectory in accordance with determinations made by the autonomous vehicle's planner, which employs the techniques described herein to plan its own future trajectory.

As discussed above, the techniques described herein have wide applicability to situations in which a robot predicts the future trajectory of a moving object. For example, in some embodiments such as the embodiment depicted in FIG. 2, the robot is a vehicle 100, and the moving object is the vehicle 100 itself (i.e., the vehicle 100 is an ego vehicle). If the vehicle 100 is driven manually, there is uncertainty regarding the evolving intentions of the human driver. Even if the vehicle 100 is autonomous (self-driving), the techniques described herein can be employed in the planner of such a vehicle 100 (e.g., to plan the vehicle's future path/trajectory). In other embodiments, the robot is a vehicle 100, and the moving object is an external road agent in the environment of the vehicle 100, such as another vehicle, a motorcycle, a bicycle, a pedestrian, a child, or an animal. However, the moving object might, in some instances, not be an external road agent on a roadway. For example, a moving object such as a pedestrian, child, or animal could be on a sidewalk, lawn, plaza, or other area near (but not on) the roadway. In still other embodiments, the robot is a type of robot other than a vehicle, such as, without limitation, an indoor robot, a service robot, or a delivery robot. In those embodiments, the moving object whose trajectory is predicted can be the robot itself (e.g., the techniques described herein can be used to aid the robot's trajectory/path planning) or any of a wide variety of objects in the environment of the robot (e.g., people, animals, other machines/robots, etc.).

This description of various embodiments of trajectory prediction systems and associated methods next turns to a more detailed explanation of the underlying theoretical and mathematical principles. This is done in connection with a discussion of FIGS. 3A, 3B, and 4. This discussion focuses on vehicular embodiments such as that shown in FIGS. 1 and 2. However, as mentioned above, the principles and concepts described herein can be applied to a broad variety of robots/machines, including indoor robots. In the description that follows, lowercase bold symbols are used to denote both the set of variables and the vector, and lowercase standard symbols are used to denote variable instantiations.

In various embodiments, a traffic agent (or "road agent") is modeled as a probabilistic hybrid automaton (PHA). Compared to a hidden Markov model, the transitions in a PHA have an autonomous property. That is, the discrete-mode evolution depends on the continuous state, which provides better model capacity in mimicking the behavior of traffic agents. The PHA is a tuple $\mathcal{H} = \langle s, w, F, T, s_0, \mathcal{Z} \rangle$, where $s = x \cup z$ denotes the hybrid state variables; z denotes the discrete mode with a finite domain $\mathcal{Z}$; $x \in \mathbb{R}^{n_x}$ denotes continuous state variables; w specifies the input/output variables, which consist of context variables c, continuous observation variables $o_x$, and discrete observation variables $o_z$; $F: \mathcal{Z} \to \mathcal{F}$ specifies the continuous evolution of the automaton for each discrete mode in terms of a set of discrete-time difference equations $\mathcal{F}$ over the variables x and c; $T: \mathcal{Z} \to \mathcal{T}$ specifies the discrete evolution of the automaton for each discrete mode as a finite set of transition probabilities drawn from $\mathcal{T}$; and $s_0$ denotes the initial hybrid state. The dependencies of hybrid state variables in a PHA are depicted as a graphical model in FIG. 3A.

Figure 3A:
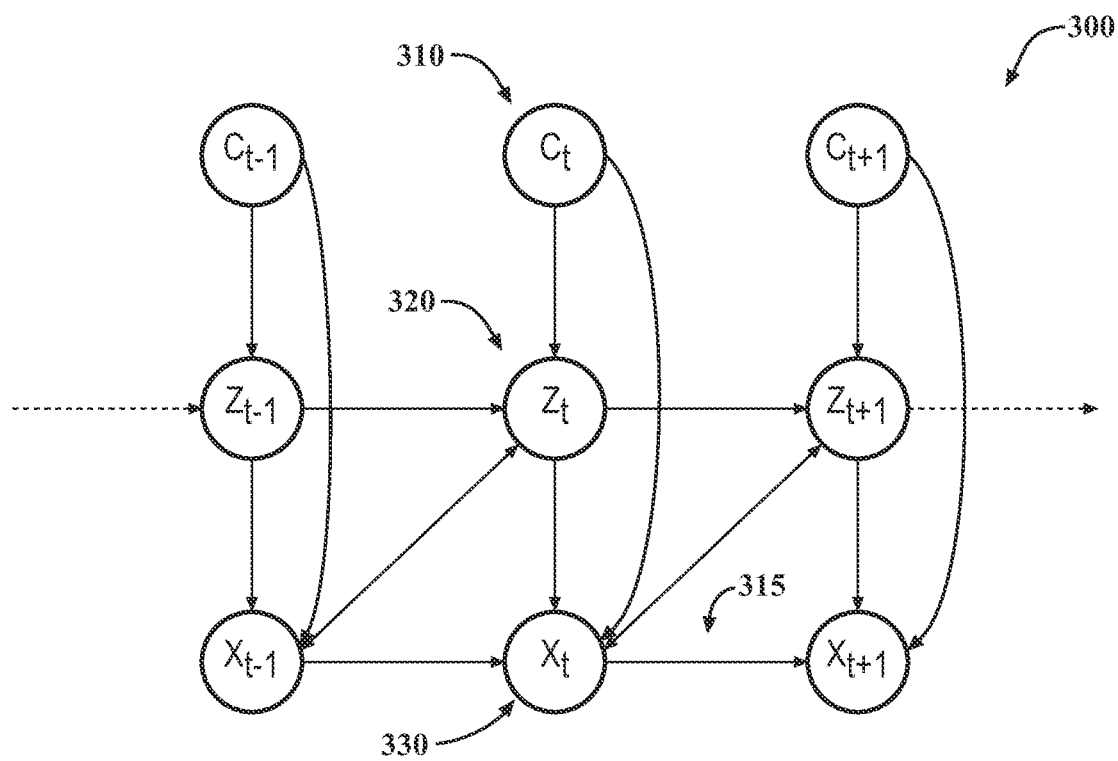
FIG. 3A illustrates a graphical model of a hybrid discrete-continuous system representing moving objects such as traffic agents, in accordance with an illustrative embodiment of the invention.

FIG. 3A illustrates a graphical model 300 of a hybrid discrete-continuous system representing moving objects such as traffic agents, in accordance with an illustrative embodiment of the invention. In FIG. 3A, observation variables have been omitted for simplicity. Graphical model 300 includes z, x, and c, which, as discussed above, represent discrete-mode variables 320, continuous-state variables 330, and context variables 310, respectively. The arrows 315 indicate variable dependencies over time. More specifically, the state evolution is governed by the transition function T and the dynamics function F, indicated in FIG. 3A by the three arrows 315 going to $z_t$ and to $x_t$, respectively.

Figure 3B:
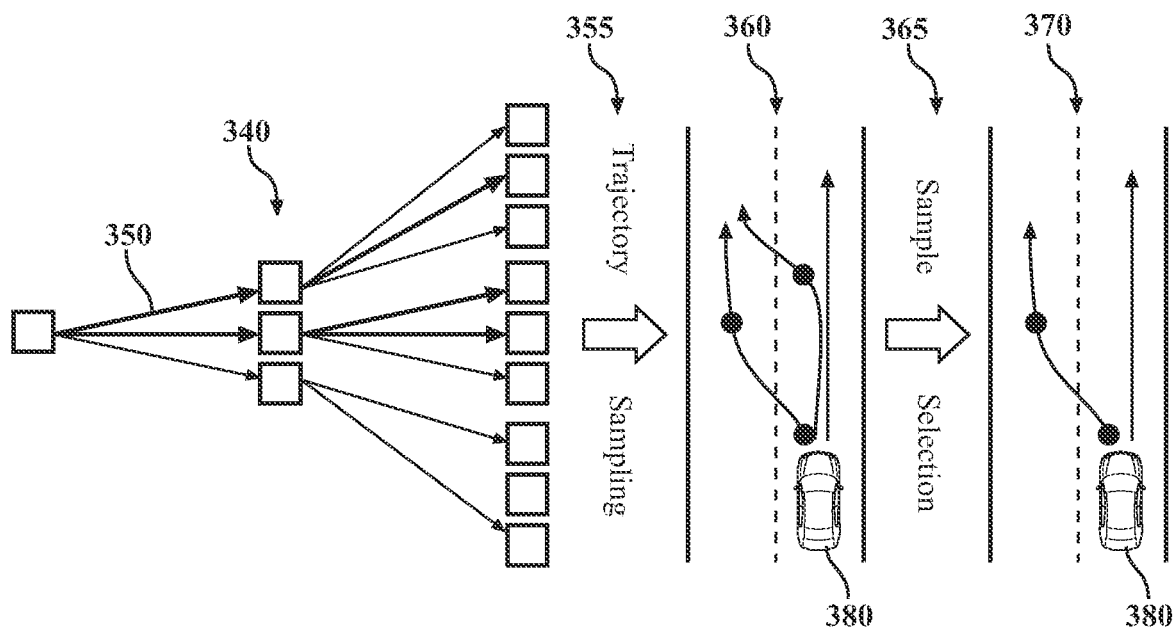
FIG. 3B illustrates a learned probabilistic hybrid automaton (PHA) model for trajectory prediction, in accordance with an illustrative embodiment of the invention.

In some embodiments, it is assumed that the discrete labels are observable at training time, defined as driving maneuvers or goal locations. These labels can be obtained through auto-labeling or unsupervised clustering over continuous trajectories. Though it can be challenging to perfectly label driver intent, the approach described herein has been shown through experiments to be robust against imperfect labels. Before turning to the details of a process for learning the PHA model as a deep neural network, a high-level overview of a trajectory prediction system is provided via FIG. 3B FIG. 3B illustrates a learned PHA model 340 for trajectory prediction, in accordance with an illustrative embodiment of the invention. As illustrated in FIG. 3B, given a learned PHA model 340, the trajectory prediction system leverages a learned proposal distribution (not shown in FIG. 3B) to generate hybrid sequence samples 350 (thicker arrows in FIG. 3B) from an exponentially growing space, which capture intent changes (red dots in FIG. 3B) over time and support coverage, the system further choosing a small set of accurate and diverse trajectories (370) using a sample selection algorithm such as farthest point sampling (FPS). That is, a trajectory sampling 355 operation employing the learned proposal distribution produces a reduced set of candidate trajectories 360 (low-level samples) for a moving object 380. A sample selection 365 algorithm such as FPS then produces one or more selected trajectories 370. In some embodiments, a final predicted trajectory can be selected from among the one or more selected trajectories 370 (e.g., a most likely trajectory among the selected trajectories 370). In FIG. 3B, moving object 380 is depicted as a vehicle, but in other embodiments, moving object 380 could be any of a variety of on- or off-roadway moving objects, as discussed above.

Regarding hybrid model learning (the learning of learned PHA model 340), given a set of observed discrete-continuous future traffic-agent states (e.g., for a moving object 380) $O=(O_x, O_z)$ and context states C, the objective is to learn a hybrid model parameterized by $\theta$ that maximizes the following data log likelihood as a maximum likelihood estimation (MLE) problem:

$$\mathcal{L}_{MLE}(O,C) = \Sigma_{o,c \in (O,C)} \log p(o|c;\theta) = \Sigma_{o,c} \Sigma_{t=1}^{H} \log p_F(o_x^t | o_x^{t-1}, o_z^t, c; \theta) + \log p_T(o_z^t | o_x^{t-1}, c; \theta), \quad (1)$$

where $o = \{(o_x, o_z)^t\}_{t=1}^{t=H}$ is an observed future hybrid trajectory sequence with horizon H, $p_F$ is a Gaussian distribution over continuous states, and $p_T$ is a categorical distribution over discrete modes. The prior for the observations is omitted, in this embodiment, because it is assumed that the observation noise is negligible. Note that while the continuous state can be directly observed from perception systems, the discrete observation can be estimated from continuous observations, as discussed above. Given the MLE problem defined by Eq. (1), the approach to learning a PHA-based encoder-decoder deep neural network model and using such a learned PHA model 340 in inference mode will next be described in connection with FIG. 4.

Figure 4:
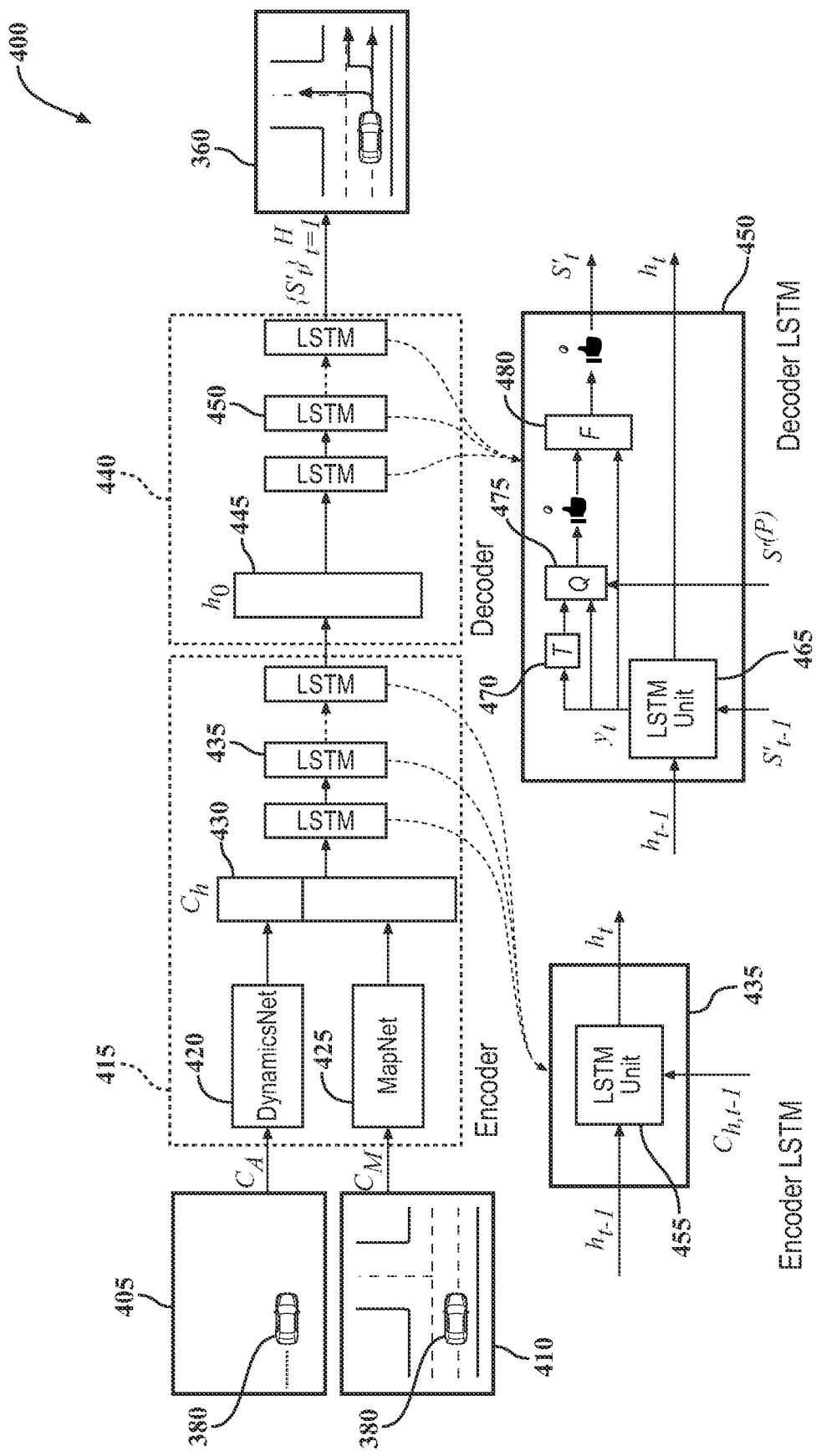
FIG. 4 is a block diagram of a deep neural network that learns a PHA model, in accordance with an illustrative embodiment of the invention.

FIG. 4 is a block diagram of a deep neural network 400 that learns a PHA model (see learned PHA model 340 in FIG. 3B), in accordance with an illustrative embodiment of the invention. As shown in FIG. 4, an encoder 415 encodes context information, such as observed path data 405 ($c_A$) and map data 410 ($c_M$), and passes the combined encoded state 430 ($c_h$) through one or more encoder LSTMs 435 that form an encoder LSTM network to obtain a hidden state vector 445 ($h_0$). The decoder 440 includes one or more additional decoder LSTMs 450 that form a decoder LSTM network to generate a sequence of hybrid states $\{s'_t\}_{t=1}^{H}$ up to a finite time horizon through a learned PHA model 340, conditioned on $h_0$. As indicated in FIG. 4, a given encoder LSTM 435 includes an encoder LSTM unit 455. As also indicated in FIG. 4, a given decoder LSTM 450 includes a decoder LSTM unit 465, a transition function 470 (T), a dynamics function 480 (F), and a proposal distribution 475 (Q) (sometimes referred to herein as a "proposal function") for improving coverage performance. Given the learned PHA model 340, the decoder 440 is used to sample multiple predictions and apply FPS in the continuous trajectory space to generate a small set of predictions (370) with good coverage (refer to FIG. 3B).

As discussed above, encoder 415 encodes the context information c, including the observed path of the target agent $c_A$ (observed path data 405) and the observed map data $c_M$ (map data 410), per time step in the past. The observed path data 405 at each step is encoded through a multi-layer perceptron (MLP) (DynamicsNet 420 in FIG. 4). Map data 410 is encoded through a MapNet 425 that takes the map input as a set of lane centerlines and performs self-attention to pool the encoded states from all centerlines. In some embodiments, DynamicsNet 420 is an MLP with 32 neurons, and MapNet 425 has a structure similar to a network known as "VectorNet" with a few modifications. First, the MLPs in MapNet 425 have a hidden dimension of 32 for consistency with the remaining MLPs in the model. Second, heading tangent values are added as additional inputs to the node feature. Third, the auxiliary node completion task is improved from reconstructing hidden node features to reconstructing explicit node inputs such as positions and headings. As also discussed above, the combined encoded state 430 ($c_h$) is input to the encoder LSTM network to obtain the hidden state vector 445 ($h_0$) at the most recent observed time step $t=0$.

As discussed above, decoder 440 generates a sequence of hybrid states, including discrete modes (driver maneuvers or "primitives," as discussed above) and continuous positions (candidate trajectories), using the decoder LSTM network. At each time step in a given decoder LSTM 450, a decoder LSTM unit 465 takes as inputs the hidden state $h_{t-1}$ and the hybrid state sample $s'_{t-1}$ from the previous step and outputs a new hidden state $h_t$ and an output state $y_t$. The output LSTM state $y_t$ is passed through a transition function 470 modeled as an MLP layer that produces a categorical distribution $P_T(z_t)$ over discrete modes at time t as logits. By definition, the transition function 470 takes the previous state and the context information directly as inputs, as shown in FIG. 3A. As shown in FIG. 4, the inputs are read through an LSTM and abuse T to represent the auxiliary transition function that takes the LSTM output $y_t$. Existing factored inference algorithms sample from T to obtain discrete samples. However, naively sampling from T may take a large number of samples to sufficiently cover the prediction space.

In some embodiments, an additional proposal distribution 475 (Q) is learned on top of the transition function 470 to sample the discrete mode for the task of achieving better prediction accuracy and coverage. The proposal distribution 475 takes input from (i) the distribution from transition function 470, (ii) the output LSTM state $y_t$, and (iii) the set of previously generated trajectory sequence samples $S'^{(P)}$, and proposal distribution 475 outputs a categorical distribution over the next discrete modes as logits. The last input makes it possible to sample adaptively conditioned on previously generated samples. Each previous full trajectory sample is encoded through an MLP layer. The max pooling of all sample encodings is passed through an MLP layer before being fed into the proposal distribution 475. Compared to existing sequential Monte Carlo methods, the proposal distribution 475 in the embodiment of FIG. 4 samples per time step, as opposed to sampling a full trajectory at once, to avoid a large proposal state.

Given the output of proposal distribution 475 (Q), the embodiment in FIG. 4 leverages a Gumbel-softmax sampler to sample the next mode $z'_t$, whose real probability is obtained from transition function 470 (T). The mode is concatenated with $y_t$ and input to dynamics function 480 (F) as an MLP layer that outputs the distribution of the continuous state $P_F(x_t)$. The distribution is parameterized as a Gaussian distribution with mean $\mu_{x'_t}$ and unit variance, which is chosen arbitrarily, in the embodiment of FIG. 4, for stable training. A continuous state $x'_t$ is then sampled from the distribution. The predicted hybrid sample $s'_t=(z'_t, x'_t)$ at time step t and the hidden state $h_t$ are used to generate the sample in the next step until the prediction time horizon is reached.

Although both transition function 470 (T) and proposal distribution 475 (Q) output a categorical distribution over modes, they serve different purposes. The transition function 470 is part of the PHA model defined above, and it is used to compute the real probability of a sample (candidate trajectory). For example, given an observation of a future hybrid state sequence, its likelihood can be computed by plugging it into the LSTM model (i.e., through transition function 470 and dynamics function 480). The likelihood is the summation of the discrete log-likelihood from $P_T$ and continuous log-likelihood from $P_F$, as in Eq. (1). This makes it possible to faithfully optimize the PHA model by maximizing the log-likelihood given the ground-truth future observations, as discussed above.

On the other hand, the proposal distribution 475 determines which samples to generate to improve prediction coverage in an exponentially growing space. It does not represent the true sample weight, which is determined by the transition function 470. The weighted sample set makes it possible to cover the prediction distribution efficiently with only a few samples, which is advantageous to existing sampling-based methods that require a large number of samples to approximate the probability distribution.

To train the proposal distribution 475 (also sometimes referred to herein as the "proposal function") for accuracy and coverage, K trajectory sequences $\{s'^{(k)}=(z'^{(k)}, x'^{(k)})\}_{k=1}^{K}$ are generated sequentially from the decoder 440, and the min-of-K L2 loss is computed compared to the ground-truth continuous observations $o_x$:

$$\mathcal{L}_Q = \min_{k \in K} \|x'^{(k)} - o_x\|_2. \qquad (2)$$

While it is possible to train the model with only the min-of-K L2 loss to favor prediction coverage, it can lead to a diluted probability density function compared to the ground truth. Consequently, in the embodiment of FIG. 4, prediction coverage is improved while ensuring accuracy by introducing the data likelihood loss in Eq. (1) above. As a result, the trajectory prediction system can leverage the proposal distribution 475 to generate representative samples while obtaining the real probability of these samples from the transition function 470. To encourage the proposal distribution 475 to be close to the transition function 470, a regularization loss $\mathcal{L}_{reg}$ is added on the L2 differences between the two distribution logits.

In many autonomous-vehicle applications, only a relatively small set of prediction samples can be afforded due to the non-trivial computational complexity of evaluating the samples for risk assessment. To further improve coverage and boost prediction performance with a limited budget for samples (candidate trajectories), the embodiment in FIG. 4 uses the FPS algorithm. In other embodiments, a different sample selection technique can be used. The FPS algorithm selects, from among the trajectories generated by the proposal distribution 475 (refer to reduced set of candidate trajectories 360 in FIG. 3B), those that are far away from one another while maintaining their probabilities through the learned PHA model 340. The FPS algorithm works by selecting the next sample farthest away from the previously selected samples in terms of the distance between end locations, the first sample selected being that with the highest likelihood. FPS is able to capture the majority of distinct options due to its 2-optimal coverage property.

In the embodiment shown in FIG. 4, at training time, the PHA model and the proposal distribution 475 are jointly trained with the following loss:

$$\mathcal{L} = -\mathcal{L}_{MLE} + \alpha \mathcal{L}_Q + \beta \mathcal{L}_{reg}, \qquad (3)$$

where the MLE term (refer to Eq. (1) above) is negated as a loss to minimize, and $\alpha$ and $\beta$ are the loss coefficients.

At inference time, the embodiment presented in FIG. 4 does the following: (i) sequentially calls the learned PHA model 340 M times with the proposal distribution 475 to generate M hybrid trajectory sequences (360); (ii) computes their likelihoods based on the probabilities from the transition function 470 and the dynamics function 480; and (iii) performs FPS to select the final N trajectory samples (370), normalizing the probabilities of each sample so they sum up to 1. This description next turns to a discussion of the methods associated with a trajectory prediction system 170.

Figure 5:
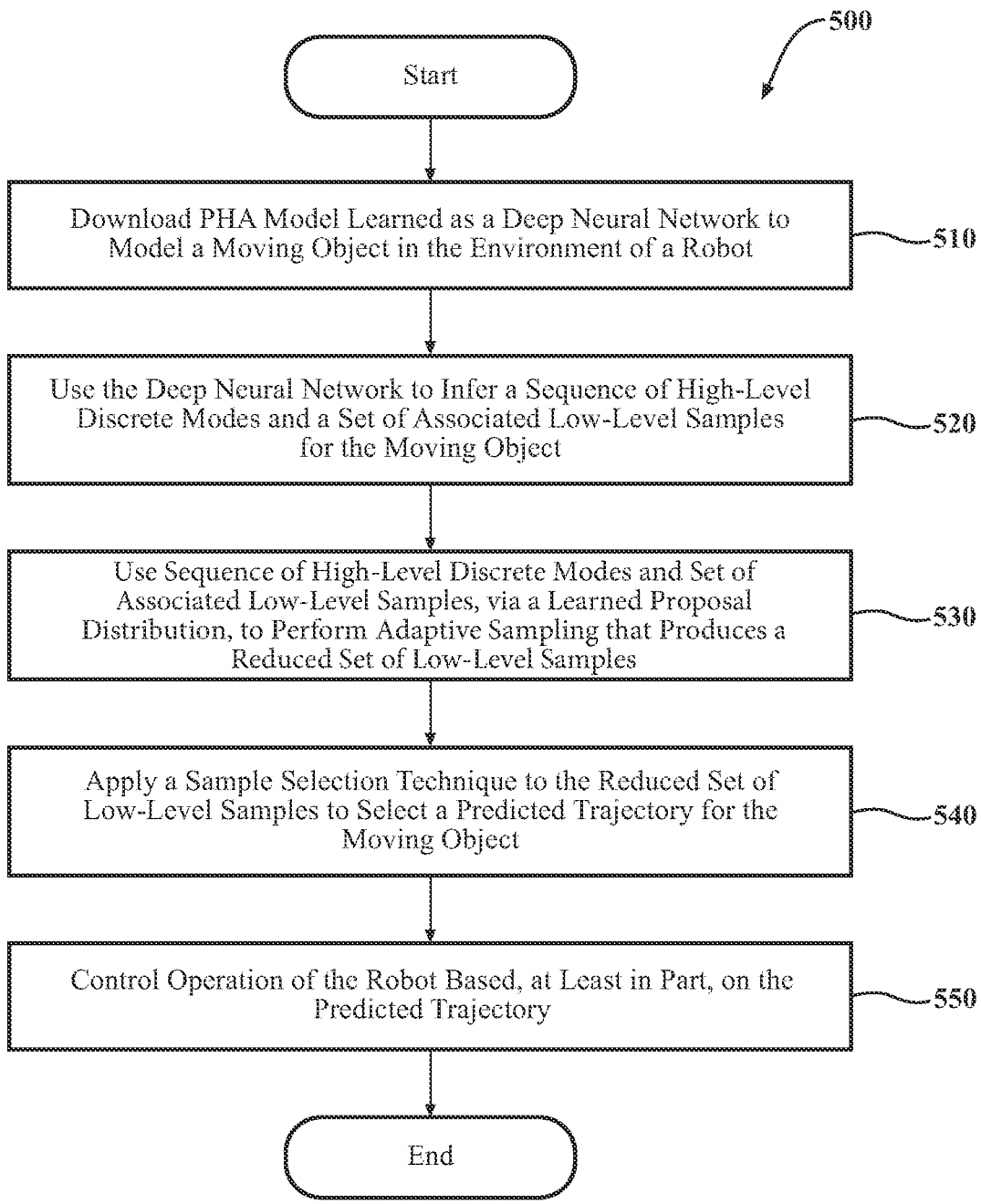
FIG. 5 is a flowchart of a method of predicting a trajectory of a moving object, in accordance with an illustrative embodiment of the invention.

FIG. 5 is a flowchart of a method 500 of predicting a trajectory of a moving object 380, in accordance with an illustrative embodiment of the invention. Method 500 will be discussed from the perspective of the trajectory prediction system 170 in FIG. 2. While method 500 is discussed in combination with trajectory prediction system 170, it should be appreciated that method 500 is not limited to being implemented within trajectory prediction system 170, but trajectory prediction system 170 is instead one example of a system that may implement method 500.

At block 510, communication module 220 downloads, to a robot, a probabilistic hybrid discrete-continuous automaton (PHA) model 340 learned as a deep neural network 400. As discussed above, the learned PHA model 340 models a moving object 380 in an environment of the robot (e.g., a vehicle 100). In some embodiments, the PHA model 340 is learned (trained) at a server or other computing system separate from the vehicle 100, and the learned PHA model 340 is subsequently downloaded (e.g., as parameters and weights associated with the trained deep neural network 400) to the vehicle 100 over a network 190 so that the learned PHA model 340 can be deployed in an in-vehicle trajectory prediction system 170. The PHA model 340 and how the deep neural network 400 that learns the PHA model 340 is trained and deployed in inference mode are discussed in greater detail above.

At block 520, trajectory prediction module 230 uses the deep neural network 400 to infer a sequence of high-level discrete modes and a set of associated low-level samples. As explained above, the high-level discrete modes correspond to candidate maneuvers for the moving object 380, and the low-level samples are candidate trajectories for the moving object 380. Examples of high-level discrete modes include, without limitation, a right turn, a left turn, a U-turn, slowing down (decelerating), speeding up (accelerating), stopping (e.g., for a stop sign, traffic signal, or passing cross-traffic), proceeding after a stop, and stopping for an indefinite period and then proceeding. As discussed above, many, but not necessarily all, of these high-level discrete modes are associated with traffic intersections.

At block 530, trajectory prediction module 230 uses the sequence of high-level discrete modes and the set of associated low-level samples, via a learned proposal distribution 475 in the deep neural network 400, to adaptively sample the sequence of high-level discrete modes to produce a reduced set of low-level samples (candidate trajectories) 360. Adaptive sampling and the learned proposal distribution 475 are discussed in greater detail above.

At block 540, trajectory prediction module 230 applies a sample selection technique to the reduced set of low-level samples (candidate trajectories) 360 to select a predicted trajectory for the moving object. As discussed above, in some embodiments, the sample selection technique produces a set of selected trajectories 370, from which a single trajectory (e.g., a most-likely trajectory) can be further selected. As also discussed above, in some embodiments, the sample selection technique employed is a FPS algorithm.

At block 550, control module 240 controls the operation of the robot (e.g., a vehicle 100) based, at least in part, on the predicted trajectory. As discussed above, controlling the operation of the robot (e.g., a vehicle 100) can include, for example, controlling the speed and/or the steering (trajectory/path) of vehicle 100. For example, in some embodiments, the robot adjusts its speed and/or trajectory to avoid colliding with the moving object 380, based on the predicted trajectory of the moving object. Collision avoidance is merely one example of how a robot might use the predicted trajectory of a moving object. For example, in embodiments in which the robot is an autonomous vehicle and the robot itself is the moving object, the autonomous vehicle can adjust its speed and/or trajectory in accordance with determinations made by the autonomous vehicle's planner, which employs the techniques described herein to plan its future trajectory.

In some embodiments, method 500 includes additional aspects and features not shown in FIG. 5. As discussed above, in some embodiments, the deep neural network 400 that learns the PHA model 340 includes an encoder LSTM network 435 that encodes context information 260 concerning the environment of the robot (e.g., a vehicle 100) and a decoder LSTM network 450 that generates a sequence of hybrid states in accordance with the learned PHA model 340. The context information 260 includes one or more of environment-sensor data, map data, observation data pertaining to the moving object 380, trajectory data associated with the robot (e.g., vehicle 100) and/or the moving object 380, traffic SPaT data, and information received from other vehicles via V2V communication (in embodiments like that shown in FIG. 2, in which the robot is a vehicle 100). In these embodiments, the decoder LSTM network 450 includes a transition function 470, a dynamics function 480, and the learned proposal distribution 475.

As discussed above, the techniques described herein have wide applicability to situations in which a robot predicts the future trajectory of a moving object 380. For example, in some embodiments such as the embodiment depicted in FIG. 2, the robot is a vehicle 100, and the moving object is the vehicle 100 itself (i.e., the vehicle 100 is an ego vehicle). If the vehicle 100 is driven manually, there is uncertainty regarding the evolving intentions of the human driver. Even if the vehicle 100 is autonomous (self-driving), the techniques described herein can be employed in the planner of such a vehicle 100 (e.g., to plan the vehicle's future path/ trajectory). In other embodiments, the robot is a vehicle 100, and the moving object is an external road agent in the environment of the vehicle 100, such as another vehicle, a motorcycle, a bicycle, a pedestrian, a child, or an animal. However, the moving object might, in some instances, not be an external road agent on a roadway. For example, a moving object such as a pedestrian, child, or animal could be on a sidewalk, lawn, plaza, or other area near (but not on) the roadway. In still other embodiments, the robot is a type of robot other than a vehicle, such as, without limitation, an indoor robot, a service robot, or a delivery robot. In those embodiments, the moving object whose trajectory is predicted can be the robot itself (e.g., the techniques described herein can be used to aid the robot's trajectory/path planning) or any of a wide variety of objects in the environment of the robot (e.g., people, animals, other machines/robots, etc.).

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120. As discussed above, in some embodiments, vehicle 100 can receive sensor data from other connected vehicles, from devices associated with ORUs, or both.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensors 121 can detect, determine, and/or sense information about the vehicle 100 itself, including the operational status of various vehicle components and systems.

In one or more arrangements, the vehicle sensors 121 can be configured to detect, and/or sense position and/orientation changes of the vehicle 100, such as, for example, based on inertial acceleration. In one or more arrangements, the vehicle sensors 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensors 121 can be configured to detect, and/or sense one or more characteristics of the vehicle 100. In one or more arrangements, the vehicle sensors 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110 and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110 and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™ Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect.

The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "module," as used herein, is not intended, under any circumstances, to invoke interpretation of the appended claims under 35 U.S.C. § 112(f).

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for predicting a trajectory of a moving object, the system comprising:
 a processor; and
 a memory storing instructions that, when executed by the processor, cause the processor to:
  download, to a robot, a probabilistic hybrid discrete-continuous automaton (PHA) model learned as a deep neural network, wherein the learned PHA model models a moving object in an environment of the robot;
  use the deep neural network to infer a sequence of high-level discrete modes and a set of associated low-level samples, wherein the high-level discrete modes correspond to candidate maneuvers for the moving object and the low-level samples are candidate trajectories for the moving object;

use the sequence of high-level discrete modes and the set of associated low-level samples, via a learned proposal distribution in the deep neural network, to adaptively sample the sequence of high-level discrete modes to produce a reduced set of low-level samples; and apply a sample selection technique to the reduced set of low-level samples to select a predicted trajectory for the moving object; and control operation of the robot based, at least in part, on the predicted trajectory.

2. The system of claim 1, wherein:
the deep neural network includes an encoder Long Short-Term Memory (LSTM) network that encodes context information concerning the environment of the robot and a decoder LSTM network that generates a sequence of hybrid states in accordance with the learned PHA model; and
the decoder LSTM network includes a transition function, a dynamics function, and the learned proposal distribution.

3. The system of claim 2, wherein the context information includes one or more of environment-sensor data, map data, observation data pertaining to the moving object, trajectory data associated with at least one of the robot and the moving object, traffic Signal Phase and Timing (SPaT) data, and information received via vehicle-to-vehicle (V2V) communication.

4. The system of claim 1, wherein the sample selection technique includes a farthest point sampling algorithm.

5. The system of claim 1, wherein the robot is a vehicle and the moving object is a road agent external to the vehicle.

6. The system of claim 5, wherein the vehicle is an autonomous vehicle.

7. The system of claim 1, wherein the robot is a vehicle and the moving object is the vehicle.

8. The system of claim 7, wherein the vehicle is an autonomous vehicle and a planner of the autonomous vehicle uses the predicted trajectory in planning a path for the autonomous vehicle.

9. The system of claim 1, wherein the robot is one of an indoor robot, a service robot, and a delivery robot.

10. A non-transitory computer-readable medium for predicting a trajectory of a moving object and storing instructions that, when executed by a processor, cause the processor to:
download, to a robot, a probabilistic hybrid discrete-continuous automaton (PHA) model learned as a deep neural network, wherein the learned PHA model models a moving object in an environment of the robot;
use the deep neural network to infer a sequence of high-level discrete modes and a set of associated low-level samples, wherein the high-level discrete modes correspond to candidate maneuvers for the moving object and the low-level samples are candidate trajectories for the moving object;
use the sequence of high-level discrete modes and the set of associated low-level samples, via a learned proposal distribution in the deep neural network, to adaptively sample the sequence of high-level discrete modes to produce a reduced set of low-level samples;
apply a sample selection technique to the reduced set of low-level samples to select a predicted trajectory for the moving object; and
control operation of the robot based, at least in part, on the predicted trajectory.

11. The non-transitory computer-readable medium of claim 10, wherein:
the deep neural network includes an encoder Long Short-Term Memory (LSTM) network that encodes context information concerning the environment of the robot and a decoder LSTM network that generates a sequence of hybrid states in accordance with the learned PHA model; and
the decoder LSTM network includes a transition function, a dynamics function, and the learned proposal distribution.

12. The non-transitory computer-readable medium of claim 10, wherein the sample selection technique includes a farthest point sampling algorithm.

13. A method, comprising:
downloading, to a robot, a probabilistic hybrid discrete-continuous automaton (PHA) model learned as a deep neural network, wherein the learned PHA model models a moving object in an environment of the robot;
using the deep neural network to infer a sequence of high-level discrete modes and a set of associated low-level samples, wherein the high-level discrete modes correspond to candidate maneuvers for the moving object and the low-level samples are candidate trajectories for the moving object;
using the sequence of high-level discrete modes and the set of associated low-level samples, via a learned proposal distribution in the deep neural network, to adaptively sample the sequence of high-level discrete modes to produce a reduced set of low-level samples;
applying a sample selection technique to the reduced set of low-level samples to select a predicted trajectory for the moving object; and
controlling operation of the robot based, at least in part, on the predicted trajectory.

14. The method of claim 13, wherein:
the deep neural network includes an encoder Long Short-Term Memory (LSTM) network that encodes context information concerning the environment of the robot and a decoder LSTM network that generates a sequence of hybrid states in accordance with the learned PHA model; and
the decoder LSTM network includes a transition function, a dynamics function, and the learned proposal distribution.

15. The method of claim 13, wherein the sample selection technique includes a farthest point sampling algorithm.

16. The method of claim 13, wherein the robot is a vehicle and the moving object is a road agent external to the vehicle.

17. The method of claim 16, wherein the vehicle is an autonomous vehicle.

18. The method of claim 13, wherein the robot is a vehicle and the moving object is the vehicle.

19. The method of claim 18, wherein the vehicle is an autonomous vehicle and a planner of the autonomous vehicle uses the predicted trajectory in planning a path for the autonomous vehicle.

20. The method of claim 13, wherein the robot is one of an indoor robot, a service robot, and a delivery robot.

* * * * *

UNITED STATES PATENT AND TRADEMARK OFFICE
CERTIFICATE OF CORRECTION

PATENT NO. : 12,168,461 B2  
APPLICATION NO. : 17/539668  
DATED : December 17, 2024  
INVENTOR(S) : Xin Huang et al.

Page 1 of 1

It is certified that error appears in the above-identified patent and that said Letters Patent is hereby corrected as shown below:

In the Claims

Claim 1, Line 20: Delete "and" after "samples;"

Signed and Sealed this  
Twenty-eighth Day of January, 2025

Coke Morgan Stewart  
*Acting Director of the United States Patent and Trademark Office*